United States Patent
Morse (10) Patent No.: US 6,429,270 B2
(45) Date of Patent: Aug. 6, 2002

(54) PROCESS FOR PREPARING OLEFIN POLYMERIZATION CATALYST MIXTURE

(75) Inventor: David Bell Morse, Houston, TX (US)

(73) Assignee: Union Carbide Chemicals & Plastics Technology Corporation, Danbury, CT (US)

(*) Notice: Subject to any disclaimer, the term of this patent is extended or adjusted under 35 U.S.C. 154(b) by 0 days.

(21) Appl. No.: 09/895,939

(22) Filed: Jun. 29, 2001

Related U.S. Application Data (63) Continuation of application No. 09/395,239, filed on Sep. 13, 1999, now abandoned.
(60) Provisional application No. 60/100,204, filed on Sep. 14, 1998.

(51) Int. Cl.[7] .................................................. C08F 4/06
(52) U.S. Cl. .................... 526/118; 526/125.3; 526/128; 502/104; 502/115; 502/116; 502/152
(58) Field of Search .............................. 526/125.3, 128, 526/118; 502/104, 115, 116, 152

(56) References Cited

U.S. PATENT DOCUMENTS

| | | | |
|---|---|---|---|
| 4,543,399 A | 9/1985 | Jenkins, III et al. | 526/70 |
| 4,588,790 A | 5/1986 | Jenkins, III et al. | 526/70 |
| 4,721,763 A | 1/1988 | Baily et al. | 526/88 |
| 4,970,184 A | 11/1990 | Schauss et al. | 502/107 |
| 5,093,415 A | 3/1992 | Brady, III et al. | 525/53 |
| 5,100,981 A | 3/1992 | Schreck et al. | 526/125 |
| 5,610,244 A | 3/1997 | Govoni et al. | 526/65 |
| 5,652,303 A | 7/1997 | Ishimaru et al. | 526/125.3 |
| 5,703,172 A * | 12/1997 | Watanabe et al. | 525/323 |
| H1722 H * | 4/1998 | Goode et al. | 525/323 |

FOREIGN PATENT DOCUMENTS

| | | | |
|---|---|---|---|
| EP | 341539 | 11/1989 | |
| EP | 368631 | 5/1990 | |
| EP | 385765 | 9/1990 | C08F/6/646 |
| EP | 717053 | 6/1996 | C08F/10/00 |
| EP | 735056 | 10/1996 | |
| WO | 8802376 | 9/1987 | |

* cited by examiner

Primary Examiner—David W. Wu
Assistant Examiner—William K Cheung (57) ABSTRACT

Catalysts that have been preactivated and/or prepolymerized are disclosed whereby a magnesium and titanium-containing procatalyst component is contacted with a co-catalyst and an external electron donor (and optionally with an olefin monomer to prepare a prepolymerized catalyst) prior to polymerization to form a preactivated and/or prepolymerized catalyst. The preactivated and/or prepolymerized catalyst then is separated from the mixture, and dried to form a solid preactivated and/or prepolymerized catalyst. This dried catalyst then can be stored and subsequently shipped to a polymerization site where it can be used in gas phase polymerization. The preactivated and/or prepolymerized catalyst can be used in gas phase polymerization as extremely high activity catalysts, and do not cause a rapid rise in reaction temperature causing overheating, undesirable formation of agglomerates, coagulation of polymer, and ultimately, reactor failure.

13 Claims, 4 Drawing Sheets

Figure 1

FIGURE 2
PARTICLE SIZE AFFECT OF IC5 ADDITION

PROCESS FOR PREPARING OLEFIN POLYMERIZATION CATALYST MIXTURE

This application is a Continuation of prior application Ser. No: 09/395,239, Filed Sep. 13 1999, now abandoned which claims the benefit of provisional application No. 60/100,204 filed Sep. 14, 1998.

BACKGROUND OF THE INVENTION

1. Field of the Invention

The present invention relates to solid catalyst materials that have been preactivated using co-catalyst components that may be subjected to prepolymerization, and the use thereof in the production of polyolefins. The invention also relates to preparing the preactivated and/or prepolymerized catalysts separate from the principle polymerization system, separating the catalysts from their reaction mixture and then using the catalysts in a method of making a polyolefin. The preactivated and/or prepolymerized catalysts preferably are carried into the polymerization reactor in a carrier containing at least an inert gas and a liquid solvent.

2. Description of Related Art

Ziegler-Natta catalysts are well known for catalyzing the polymerization of olefins. Conventional Ziegler-Natta catalysts are those that contain a procatalyst made from contacting an internal electron donor, a titanium source, a magnesium source and a halogenating agent (which may be combined with one of the other components). This procatalyst then typically is combined with an external selectivity control agent ("SCA") and an aluminum alkyl to produce the Ziegler-Natta catalyst system. See, e.g., U.S. Pat. No. 4,393,182 to Job. Generally, the selectivity control agents may be any of several classes of electron donative compounds, but one class that has been studied extensively is the class of organosilicon compounds having at least one Si—O (i.e., siloxy) bond. These compounds include tetra, tri, bi and mono alkoxy silanes. While these SCAs are good selectivity control agents, they usually provide for only a limited range of polymer product properties, such as a narrow range of available polymer molecular weight distribution (MWD) within the range that is available through the use of various internal electron donors.

It is known that any two of the three final components of the catalyst system may be brought together shortly before introduction into the primary polymerization reactor. Also, it is known that all three components may be brought together (the procatalyst, co-catalyst, and SCA) prior to introduction to the polymerization reactor in a method known as preactivation. Finally, it is also known that the preactivated material, either separately or simultaneously, may be exposed to an olefin (procatalyst, co-catalyst, SCA(s) and monomer(s)) to form a prepolymer, and then subjecting the prepolymer to primary polymerization in a primary polymerization reactor. The preactivation and prepolymerization methods especially serve to form highly active catalysts.

When such highly active catalysts are used, the polymerization in the polymerization reactor begins very rapidly, immediately upon introduction of the preactivated catalyst and/or prepolymerized catalyst to the reactor. The rapid reaction results in an attendant rapid rise in reaction temperature causing overheating, undesirable formation of agglomerates, coagulation of polymer, and ultimately, reactor failure. This is particularly true in gas phase polymerization systems. To avoid this rapid rise in temperature, preactivated and prepolymerized catalysts may be fed directly to the polymerization reactor in the slurry or suspension in which the catalysts were formed (i.e., on-line or in-line). It previously was thought that feeding a preactivated and/or prepolymerized catalyst to a gas phase reactor in solid form (together with additional co-catalyst, SCA(s), monomer(s), recycle and condensed gas, etc., as needed; i.e., off-line prepared catalyst material) would cause immediate and intense reaction inside the gas phase reactor resulting in the aforementioned disadvantages.

U.S. Pat. No. 4,721,763 discloses a process for polymerizing olefins whereby a prepolymerization stage is conducted in a liquid phase prior to gas phase polymerization. In this process, prepolymerization is effected by contacting the olefin with a Ziegler catalyst system in the liquid phase (suspension or slurry) and then subjecting the prepolymerized catalyst to a second prepolymerization in the gas phase and then subjecting that prepolymer to polymerization in the gas phase. Thus, the activity of the catalyst is reduced significantly before being fed to the full-scale polymerization reactor by conducting two prepolymerization steps. The two-stage prepolymerization approach is very costly and an inefficient mechanism to prepolymerize a catalyst.

U.S. Pat. No. 5,610,244 discloses a process for polymerizing ethylene in a fluidized bed whereby a titanium or vanadium-containing catalyst component is preactivated or prepolymerized prior to being fed to a gas phase polymerizer. The precontacting and prepolymerization are conducted in-line whereby the solid catalyst component and co-catalyst (triethylaluminum—TEAL) are contacted briefly, and then they are fed to a prepolymerizer loop reactor and then fed directly to the reactor.

International Patent Publication No. WO 88/02376 discloses a process for polymerizing olefins whereby a solid magnesium and titanium-containing catalyst procatalyst component is prepolymerized prior to being fed to a gas phase reactor. In accordance with the process, the catalyst components are contacted with monomer in a liquid phase loop reactor to form a prepolymer, whereby the weight ratio of monomer to solid catalyst procatalyst component is at least about 6000:1, and the residence time is less than 400 seconds. The prepolymer then is directly fed in-line together with the other unreacted components to a gas phase reactor. On-site in-line preactivation and prepolymerization may help to solve the problem of excess heat generation by feeding the components in a liquid stream to the reactor, but it requires additional processing and additional equipment at the gas phase polymerization plant. In addition, these in-line preactivation and prepolymerization methods typically do not result in any significant savings in terms of raw material usage, or in capital cost savings at the polymerization plant.

SUMMARY OF THE INVENTION

There exists a need to develop preactivated or prepolymerized catalysts that can be prepared off-line and sold to polymer manufacturers. There also exists a need to provide polymer manufacturers with extremely high activity catalysts, such as preactivated and/or prepolymerized catalysts, that do not result in rapid rise in reaction temperature causing overheating, undesirable formation of agglomerates, coagulation of polymer, and ultimately, reactor failure. In addition, there exists a need to provide a preactivated and/or prepolymerized catalyst that can be used to polymerize olefins in high yield using less solid catalyst and external selectivity control agent (SCA).

It is therefore a feature of the invention to provide preactivated and/or prepolymerized catalysts that can be used to make polyolefin polymers in high yield at high production rates and at reduced costs. It is an additional object of the present invention to provide an economically efficient method of making polyolefin polymers using preactivated and prepolymerized catalysts resulting in polymers with improved physical properties, including, for example, increased bulk density, decreased average particle size and varied molecular weight distribution (MWD).

In accordance with these and other features of the present invention, there is provided a solid preactivated catalyst component that includes (a) a solid procatalyst component which is the reaction product of a magnesium compound, a tetravalent titanium halide and an internal electron donor, with (b) a cocatalyst, and (c) at least one silicon compound. The solid preactivated catalyst component is prepared by a process comprising contacting a procatalyst (A) comprising the reaction product of (i) a magnesium compound, (ii) a tetravalent titanium halide and (iii) an internal electron donor, with (B) a co-catalyst, and (C) at least one silicon-containing external electron donor, which may be the same or different than the internal electron donor (iii) to form a solid preactivated catalyst. The solid preactivated catalyst then is separated from the remaining components of the mixture resulting from contacting the aforementioned components, and then dried to form a dry, solid preactivated catalyst component. The catalyst components preferably are contacted for a period of time sufficient to form a preactivated catalyst which can be fed immediately or later to a polymerization reactor, or which can be prepolymerized prior to feeding to a polymerization reactor.

In accordance with another feature of the invention, there is provided a method of polymerizing an olefin in the gas phase comprising polymerizing an olefin monomer in a gas phase reactor in the presence of the aforementioned solid preactivated catalyst, a co-catalyst and an external electron donor, wherein the amount of the external electron donor used is from 10 to 90% of the amount of external donor that would be used with the same catalyst components that were not preactivated. In the method, the preactivated catalyst preferably is fed to the reactor in an inert carrier.

In accordance with another feature of the invention, there is provided a prepolymerized olefin polymerization catalyst prepared by a process comprising contacting a procatalyst (A) comprising the reaction product of (i) a magnesium compound, (ii) a tetravalent titanium halide and (iii) an internal electron donor, with (B) a co-catalyst, and (C) at least one silicon-containing external electron donor, which may be the same or different than the internal electron donor (iii) to form a solid preactivated catalyst. The solid preactivated catalyst then is contacted with an olefin monomer to form a solid prepolymerized catalyst. The solid prepolymerized catalyst then is separated from the remaining components of the mixture resulting from contacting the preactivated catalyst with the monomer. Finally, the solid prepolymerized catalyst is dried to form a dry, solid prepolymerized catalyst.

In accordance with yet another feature of the invention, there is provided a method of polymerizing an olefin in the gas phase comprising polymerizing an olefin monomer in a reactor in the presence of the aforementioned prepolymerized catalyst, a co-catalyst and an external electron donor, wherein the amount of the external electron donor used is from 10 to 90% of the amount of external donor that would be used with the same catalyst components that were not prepolymerized. In the method, the prepolymerized catalyst preferably is fed to the reactor in an inert carrier.

In accordance with another feature of the invention, there is provided a method of making a preactivated catalyst comprising contacting a procatalyst (A) comprising the reaction product of (i) a magnesium compound, (ii) a tetravalent titanium halide and (iii) an internal electron donor, with (B) a co-catalyst, and (C) at least one silicon-containing external electron donor, which may be the same or different than the internal electron donor (iii) to form a solid preactivated catalyst. The solid preactivated catalyst then is separated from the remaining components of the mixture resulting from the above-mentioned contacting. The separated preactivated catalyst then is dried to form a dry, solid preactivated catalyst.

These and other objects of the invention will be readily apparent to those skilled in the art upon reading the detailed description of preferred embodiments that follows.

DETAILED DESCRIPTION OF PREFERRED EMBODIMENTS

Throughout this description, the term "preactivated" denotes a catalyst system whereby some or all of the catalyst components, preferably Ziegler-Natta catalyst components (solid magnesium and titanium-containing component, cocatalyst and SCA) are contacted with one another prior to polymerization for a period of time sufficient to preactivate the catalyst system, and then dried. Throughout this description, the term "prepolymerized" and the expression "prepolymerized catalyst" denotes contacting some or all of the catalyst components, preferably Ziegler-Natta catalyst components, with an olefin (either the same or different olefin from that ultimately polymerized) to form a prepolymer. This prepolymerized catalyst then is added to the polymerization reactor with additional cocatalyst and optionally additional similar or different SCA and polymerized together with an olefin monomer or monomers to produce the olefin polymer, copolymer, terpolymer, and the like, and mixtures thereof.

The magnesium and titanium-containing catalyst component employed in the preparation of the solid procatalyst component can be any component containing magnesium, titanium and halogen that is capable of polymerizing an α-olefin. This magnesium and titanium-containing component can be prepared by any manner known in the art. Ostensibly, the magnesium compound can be any magnesium compound capable of reacting with a titanium component and an internal electron donor to form an effective polymerization procatalyst. Preferably, the magnesium compound is a magnesium halide, alkyl, aryl alkoxide, aryloxide, dialkoxide, a carbonated magnesium dialkoxide, a carbonated magnesium diaryloxide, or a magnesium titanium alkoxide complex. Most preferably, the magnesium compound is a carbonated magnesium diaryloxide, or a magnesium titanium akoxide complex. Magnesium compounds containing one alkoxide and one aryloxide group can also be employed, as well as magnesium compounds containing a halogen in addition to one alkoxide or aryloxide group, or containing additional electron donating compounds. The alkoxide groups, when present, most suitably contain from 1 to 8 carbon atoms, preferably from 2 to 6 carbon atoms. The aryloxide groups when present, most suitably contain from 6 to 10 carbon atoms. When halogen is present, it is preferably chlorine.

Among the magnesium dialkoxides and diaryloxides which can be employed are those of the formula $Mg(O(C(O)OR')_x(OR'')_{2-x}$, wherein R' and R'' are alkoxide or aryloxide groups or halogen, and x is about 0.1 to about 2. The most preferred magnesium compounds are carbonated magnesium ethoxides (CMEO), and magnesium diethoxide or $Mg_3Ti(OEt)_8X_2$ where Et represents ethyl and X is preferably chloride.

Optionally, the magnesium may be halogenated with an additional halogenating agent, e.g., thionyl chloride or alkylchlorosilanes, prior to its contact with the tetravalent titanium halide.

The magnesium compound also can be prepared as a solid precursor component whereby a magnesium compound first is reacted with at least one titanium compound and at least one alcohol in the presence of a solvent, and the precursor component is crystallized from the solution, separated and dried. Preferably, magnesium ethoxide $(Mg(OEt)_2$ is reacted with titanium tetraalkoxide, preferably titanium tetraethoxide $(Ti(OEt)_4$ and a titanium tetrahalide, preferably $TiCl_4$, in the presence of o-cresol, ethyl alcohol and monochlorobenzene. Most preferably, the magnesium and titanium-containing precursor component has the formula $Mg_3Ti(OEt)_8Cl_2$. Any of the magnesium-containing precursor compounds described in U.S. Pat. Nos. 5,034,361; 5,082,907; 5,151,399; 5,229,342; 5,106,806; 5,146,028; 5,066,737; and 5,077,357, the disclosures of which are incorporated by reference herein in their entirety, can be used in the present invention.

The titanium compound employed in the preparation of the solid magnesium and titanium-containing procatalyst component (a), which typically entails reacting the magnesium and titanium-containing precursor described above with a titanium compound, can be any titanium compound capable of reacting with the magnesium component and an internal electron donor to form an effective polymerization procatalyst. Preferably, the titanium compound is a tetravalent titanium halide that contains at least two halogen atoms, and preferably contains four halogen atoms. Most preferably these halogen atoms are chlorine atoms. However, titanium compounds containing up to two alkoxy and/or aryloxy groups can also be employed. The alkoxy groups, when present, most suitably contain from 1 to 8 carbon atoms, preferably from 2 to 6 carbon atoms. The aryloxy groups, when present, most suitably contain from 6 to 12 carbon atoms, preferably from 6 to 10 carbon atoms. Examples of suitable alkoxy- and aryloxy-titanium halides include diethoxy titanium dibromide, isopropoxy titanium triiodide, dihexoxy titanium dichloride, and phenoxy titanium trichloride.

The magnesium compound can be reacted (i.e., halogenated) with a tetravalent halide, preferably a tetravalent titanium halide, in the presence of an internal electron donor and preferably a halohydrocarbon. If desired, an inert hydrocarbon diluent or solvent may also be present, although this is not necessary. The halohydrocarbon employed may be aromatic, aliphatic, or alicyclic. Most preferably, the halogen of the halohydrocarbon is chlorine. Aromatic halohydrocarbons are preferred, particularly those containing from 6 to 12 carbon atoms, preferably 6 to 10 carbon atoms. Preferably such halohydrocarbons contain 1 or 2 halogen atoms, although more may be present if desired. Suitable aromatic halohydrocarbons include, but are not limited to, chlorobenzene, bromobenzene, dichlorobenzene, dichlorodibromobenzene, chlorotoluene, dichlorotoluene and chloronaphthalene.

The aliphatic halohydrocarbons which can be employed suitably contain from 1 to 12 carbon atoms, preferably from 1 to 9 carbon atoms and at least 2 halogen atoms. Suitable aliphatic halohydrocarbons include dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, carbon tetrachloride and trichloroethane.

The alicyclic halohydrocarbons which can be employed contain from 3 to 12 carbon atoms, and preferably from 3 to 9 carbon atoms, and at least 2 halogen atoms. Suitable alicyclic halohydrocarbons include dibromocyclobutane and trichlorocyclohexane.

The preferable internal electron donor is a polycarboxylic acid ester, though other internal electron donors as are known in the art that are suitable for use with the magnesium titanium olefin polymerization catalysts may be employed. See, e.g., U.S. Pat. No. 4,393,182 to Job, which is incorporated herein by reference. Suitable esters have two ester groups attached to adjacent carbon atoms of the molecule and lie in a single plane. Such esters include: (a) polycarboxylic acid esters containing two ester groups which are attached to ortho carbon atoms of a monocyclic or polycyclic aromatic ring, each of said ester groups being further linked to a branched or unbranched chain hydrocarbon radical, (b) polycarboxylic acid esters containing two ester groups which are attached to vicinal carbon atoms of a non-aromatic monocyclic or polycyclic ring and which lie in a cis configuration with respect to each other, each of said ester groups being further linked to a branched or unbranched chain hydrocarbon radical, and (c) polycarboxylic acid esters containing two ester groups which are attached to vicinal double bonded carbon atoms of an unsaturated aliphatic compound and which lie in a syn configuration with respect to each other, each of said ester groups being further linked to a branched or unbranched chain hydrocarbon radical.

Examples of the polycarboxylic acid esters include, but are not limited to, dimethyl phthalate, diethyl phthalate, di-n-propyl phthalate, diiusopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl-1,2-fluorenedicarboxylate, diisopropyl-1,2-ferrocene dicarboxylate, cis-diisobutyl-cyclobutane-1,2-dicarboxylate, endo-diisobutyl-5-norbornene-2,3-dicarboxylate and endo-diisobutyl-bicyclo[2.2.2]oct-5-ene-2,3-dicarboxylate, diisobutyl maleate, and diisoamyl citraconate. Dibutyl phthalate is most preferred. Esters of the following acids also may be used: ciscyclobutane-1,2-dicarboxylic acid, endo-5-norbornene-2,3-dicarboxylic acid, endo dicyclopentadiene-2,3-dicarboxylic acid, and endo bicyclo[3.2.1]oct-2-ene-6,7-dicarboxylic acid.

If desired, the esters may be substituted with one or more substituents which are inert under the reaction conditions employed during esterification, as well as during preparation of the solid catalyst component and polymerization with said catalyst component. Suitable compounds include maleic acid, citraconic acid, and the like.

Halogenation of the magnesium compound with the preferred halogenated tetravalent titanium halide can be effected by employing an excess of the titanium halide. At least 2 moles of the titanium halide should ordinarily be employed per mole of the magnesium compound. Preferably from 4 moles to 100 moles of the titanium halide are employed per mole of the magnesium compound, and most preferably from 4 moles to 20 moles of the titanium halide are employed per mole of the magnesium compound.

The halohydrocarbon can be employed in an amount sufficient to dissolve the titanium halide and the internal electron donor, and to adequately disperse the magnesium compound. Usually, the dispersion contains from 0.005 to 2.0 moles of the solid magnesium compound per mole of halohydrocarbon, preferably from 0.01 to 1.0 mole of the solid magnesium compound per mole of the halohydrocarbon. The internal electron donor typically is employed in an amount sufficient to provide a molar ratio of said compound to the titanium halide of from 0.000.5:1 to 2.0:1, preferably from 0.001:1 to 0.1:1.

Halogenation can be effected at a temperature of from about 60° C. to about 150° C., preferably from about 70° C. to about 120° C. Usually the reaction is allowed to proceed over a period of 0.1 to 6 hours, preferably between about 0.5 to about 3.5 hours. For convenience, halogenation is usually effected at atmospheric pressure, although higher and lower pressures can be employed if desired. The halogenated product, like the starting magnesium compound, is a solid material which can be isolated from the liquid reaction medium by filtration, decantation or any suitable method.

After the solid halogenated product has been separated from the liquid reaction medium, it may be treated one or more times with additional tetravalent titanium halide to remove residual alkoxy and/or aryloxy groups and maximize catalyst activity and other desired properties. Preferably, the halogenated product is treated at least twice with separate portions of the tetravalent titanium halide. Generally, the reaction conditions employed to treat the halogenated product with the titanium halide are the same as those employed during the initial halogenation of the magnesium compound, although it is not necessary that the internal electron donor be present during this treatment though it may be. A halohydrocarbon usually is employed, however, to dissolve the titanium halide and disperse the solid, halogenated product.

To assist in the removal of residual alkoxy and/or aryloxy moiety from the halogenated product, the latter such treatment may be effected in the presence of an acid halide. While it is possible to employ the acid halide separately, for convenience it is preferable to employ it together with the titanium halide dissolved in the halohydrocarbon. If desired, the halogenated product may be treated with the acid halide before or after it is treated with the titanium compound for the second time. From 5 mmol to 200 mmol of the acid halide are generally employed per gram atom of magnesium of the halogenated product. Preferably, the halide moiety of the acid halides is chloride and the acid moiety corresponds to the polycarboxylic acid moiety of the inside electron donor employed in the preparation of the solid catalyst component. Suitable acid halides include phthaloyl dichloride, 2,3-naphthalenedicarboxylic acid dichloride, endo-5-norbornene-2,3-dicarboxylic acid dichloride, maleic acid dichloride, citraconic acid dichloride, and the like.

After the solid halogenated product has been treated one or more times with additional tetravalent titanium halide, it is separated from the liquid reaction medium by filtration, siphoning, and the like, washed with an inert hydrocarbon to remove unreacted titanium compounds, and dried. The solid halogenated product also can be suspended in mineral oil with addition of aliphatic hydrocarbon solvent, and then separated by filtration, drying, and the like to form a procatalyst.

The final washed procatalyst product suitably has a titanium content of from about 0.5 percent by weight to about 6.0 percent by weight, preferably from about 1.5 percent by weight to about 4.0 percent by weight. The atomic ratio of titanium to magnesium in the final procatalyst product usually is between about 0.01:1 and about 0.2:1, preferably between about 0.02:1 and about 0.1:1. The internal electron donor typically is present in the procatalyst in a ratio of internal electron donor to magnesium of from about 0.005:1 to about 10.0:1, preferably from about 0.02:1 to about 2.0:1.

The magnesium and titanium-containing procatalyst serves as component (a) in the Ziegler-Natta catalyst system. The cocatalyst component (b) employed in the Ziegler-Natta catalyst system may be chosen from any of the known activators of olefin polymerization catalyst systems employing a titanium halide, but organoaluminum compounds are preferred. Trialkylaluminum compounds are particularly preferred, particularly those wherein each of the alkyl groups contain from 1 to 6 carbon atoms. Suitable organoaluminum cocatalysts include compounds having the formula $Al(R''')_d X_e H_f$ wherein: X is F, Cl, Br, I or OR''', R''' and R''' are saturated hydrocarbon radicals containing from 1 to 14 carbon atoms, which radicals may be the same or different, and, if desired, substituted with any substituent which is inert under the reaction conditions employed during polymerization, d is 1 to 3, e is 0 to 2, f is 0 or 1, and d+e+f=3.

Such cocatalysts can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$.

The final component of the Ziegler-Natta catalyst system is the selectivity control agent (SCA), or external electron donor. It is preferred in the present invention to use at least one silicon compound as the SCA. Useful silicon compounds of the invention contain at least one silicon-oxygen-carbon linkage. Suitable silicon compounds include those having the formula $R^1_m SiY_n X_p$ wherein: $R^1$ is a hydrocarbon radical containing from 4 to 20 carbon atoms, Y is —$OR^2$ or —$OCOR^2$ wherein $R^2$ is a hydrocarbon radical containing from 1 to 20 carbon atoms, X is hydrogen or halogen, m is an integer having a value of from 0 to 3, n is an integer having a value of from 1 to 4, p is an integer having a value of from 0 to 1, and preferably 0, and m+n+p=4. $R^1$ should be such that there is at least one non-primary carbon in the alkyl and preferably, that such non-primary carbon is attached directly to the silicon atom. Examples of $R^1$ include cyclopentyl, t-butyl, isopropyl or cyclohexyl. Examples of $R^2$ include ethyl, butyl, isopropyl, phenyl, benzyl and t-butyl. Examples of X are Cl and H.

Each $R^1$ and $R^2$ may be the same or different, and, if desired, substituted with any substituent which is inert under the reaction conditions employed during polymerization. Preferably, $R^2$ contains from 1 to 10 carbon atoms when it is aliphatic and may be sterically hindered or cycloaliphatic, and from 6 to 10 carbon atoms when it is aromatic.

Silicon compounds in which two or more silicon atoms are linked to each other by an oxygen atom, i.e., siloxanes or polysiloxanes, may also be employed, provided the requisite silicon-oxygen-carbon linkage is also present.

If more than one silicon compound is utilized in the present invention, the two or more compounds must be separate and distinct from each other and have different reactivities. This reactivity difference may be measured in terms of hydrogen response which can be determined in two ways: (1) by maintaining a constant hydrogen concentration for given polymerization reaction conditions and determining the difference in melt flow of two polymers made with two catalysts of the present invention, except each of the two catalysts has only one of the two silicon compounds as the sole external electron donor; or (2) by determining the hydrogen concentration necessary to achieve a given melt flow polymer at specified polymerization reaction conditions made with two catalysts of the present invention except each of the two catalysts has one of the two different silicon compounds as the sole external electron donor. For example, if the resulting melt flows of the polymers made with these two catalysts vary by at least about an order of magnitude (i.e., a factor of ten), then the two silicon compounds can be said to have commercially relevant different reactivities. This definition of differing reactivities is not intended to be limiting because, as is apparent to one of ordinary skill in the art, other ways of determining silicon compound reactivity may be used.

To achieve this difference in reactivities of the silicon compounds, it is likely that each of the silicon compounds will have a different number of alkoxy and/or halide functionalities thereon, with one silicon compound having a greater number of such alkoxy and halide groups than the other. This may be expressed such that n+p (per the formula above) of one silicon compound is greater than the n+p of the other silicon compound used herein and more preferably, p=0 and the "n" values of the two silicon compounds are different from each other. It is preferred that one silicon compound be a dialkoxy silane, e.g., methyl cyclohexyl dimethoxysilane, diphenyl dimethoxy silane or dicyclopentyl dimethoxysilane, and the other be a tri or tetraalkoxy silane, e.g., n-propyltrimethoxy silane, ethyltriethoxysilane or tetraethoxysilane. Skilled artisans understand that the first silicon and second silicon "compounds" may each be groups of different silicon molecules, so long as each of these two groups as a whole has different reactivity from the other.

Each of the silicon compounds can be present at molar ratios of the silicon compound to titanium of from about 1:1 to about 50:1. Preferably the silicon compounds are present from about 3:1 to about 40:1. Most preferably they are present from about 5:1 to about 30:1. The ratio between the silicon compounds varies depending upon the relative reactivities of the compounds, the polymerization reactor performance, and the desired polymer properties.

The procatalyst can be preactivated or used to "prepolymerize" a monomer or monomers before use in the primary polymerization. One of the potential advantages of preactivated and prepolymerized catalysts is that they can be more productive because they enter the reactor as active catalysts. There is little to no inherent induction time so no residence time in the reactor is wasted by using a preactivated or prepolymerized catalyst. This is particularly important for polypropylene impact copolymers because it is believed that catalyst particles that do not make enough homopolymer in the first reactor and hence remain active, are then carried into the second reactor together with the homopolymer. The presence of these still active catalyst particles in the second reactor is believed to cause the formation of large rubber particles in the second reactor that become gels and decrease impact resistance. This is known as catalyst "bypassing" and a common problem of linked continuously stirred tank reactors (CSTRs) While not intending to be bound to any theory, the present inventors believe that preactivation and prepolymerization should reduce, and perhaps eliminate, the adverse effects of catalyst bypassing on impact copolymer properties.

Preactivation may be accomplished in several ways. First the procatalyst, cocatalyst and silicon compound(s) may be suspended in an inert diluent, such as one or more hydrocarbons, including, but not limited to, toluene, isooctane, isopentane, and halohydrocarbons, such as o-chlorotoluene or monochlorobenzene. This mixture then is agitated. During agitation it is preferred that the suspension remain at ambient or below temperature. The catalyst may then be separated from the reaction mixture, washed with an inert hydrocarbon or halohydrocarbon to remove excess reactant and dried. Filtering is preferred over heating for such drying, although either or both could be used. If a second silicon compound is to be used and was not optionally added before this combination, it may then be physically blended with this catalyst, but at least one silicon compound preferably was chemically blended with the catalyst.

The procatalyst, cocatalyst and silicon compound(s) can be contacted with one another for a period of time sufficient to preactivate the procatalyst. That is, the components are contacted for a period of time sufficient to prepare a catalyst component that is more capable of polymerizing an olefin monomer than the individual catalyst components alone. Preferably, the activity of the preactivated component is increased by greater than 50%, more preferably greater than 100% and most preferably greater than 200%, when compared to the individual catalyst components alone, which typically are incapable of polymerizing an olefin monomer.

The components preferably are contacted for a period of from 10 seconds to 5 hours, more preferably from about 30 seconds to 4 hours, and even more preferably, from about 1 minute to about 1 hour. Those skilled in the art are capable of determining the appropriate contact time sufficient to form a preactivated catalyst. Typically, the preactivated catalyst is one which will polymerize an olefin without addition of cocatalyst, when compared to a procatalyst, which polymerizes no olefin without addition of cocatalyst. Preactivation usually is carried out in the substantial absence of olefin monomer, preferably less than 1 wt. %, more preferably less than 0.1 wt. %, and most preferably less than 0.05 wt. % olefin monomer.

Alternatively or in conjunction with preactivation, prepolymerization may be used to preactivate the catalyst. A small amount of olefin may be added to the mixture of procatalyst, cocatalyst and at least one silicon compound thereby initiating polymerization. The catalyst may optionally be isolated from the reaction solvent before contact with the prepolymerization olefin monomer. The amount of olefin monomer for use in such prepolymerization should be at least 0.03 grams of olefin per gram of catalyst. The greater the amount of olefin used, the greater the amount of polymer initially produced. The olefin need not be the same as the olefin to be polymerized, and propylene is preferred. Again, if a second silicon compound is used, and was not previously added, then it can be physically mixed with the rest of the catalyst. Optionally, additional co-catalyst may be used during the prepolymerization reaction.

It is possible also to form two prepolymerized or preactivated catalysts per either of the above-described methods, each with at least one silicon compound and either physically blend the two catalysts together or add the two prepolymerized catalysts together into the polymerization reactor.

Preactivation or prepolymerization of the catalyst typically results in the partial or complete removal of the internal electron donor. Therefore, when the catalyst is used, there may be no internal electron donor left, and the cocatalyst and the SCA act as the electron donor. When such a preactivated or prepolymerized catalyst is ultimately fed to a polymerization reactor, substantially less SCA is needed in the primary polymerization reactor. No additional SCA is required however typically, anywhere from 10 to 99% less SCA can be used to advantageously vary polyolefin product properties in the primary polymerization if preactivated or prepolymerized catalysts are used, when compared to using conventional Ziegler-Natta catalyst components that have not been preactivated and/or prepolymerized. Preferably, anywhere from about 50 to about 98% less SCA can be used, and even more preferably, from about 80 to about 95% less SCA can be used in the primary polymerization when preactivated and/or prepolymerized catalysts are employed, thereby resulting in significant raw material cost savings.

The cocatalyst and the selectivity control agent preferably are employed in preactivation and/or prepolymerization in such amounts as to provide an atomic ratio of metal (e.g., Al) in the cocatalyst to titanium in the procatalyst of from 0.5:1 to 100:1, more preferably from 2:1 to 50:1. After contacting the components to form a preactivated and/or prepolymerized catalyst, the solid preactivated and/or prepolymerized component is separated from the reaction mixture. Any means known in the art may be employed to effect separation of the solid component. The solid component then preferably is washed and dried again using techniques known in the art. Skilled artisans are capable of separating, optionally washing, and drying the solid preactivated and/or prepolymerized catalyst using the guidelines provided herein.

The preactivated and/or prepolymerized catalyst may be suspended by placing it in an inert diluent, such as mineral oil or light hydrocarbon, such as isopentane, hexane, or propane, or it may be left dry and fed as a dry solid to the reactor. For ease of delivery to the reactor and for storage, it is preferred to slurry the catalyst.

The catalysts may be used in slurry, liquid phase, gas phase and liquid monomer-type reaction systems as are known in the art for polymerizing olefins. Commercial polymerization preferably is conducted in a fluidized bed polymerization reactor, however, by continuously contacting an α-olefin having 3 to 8 carbon atoms with the preactivated and/or prepolymerized catalyst, and optionally, additional cocatalyst and SCA. In accordance with the process, discrete portions of the catalyst components are continually fed to the reactor in catalytically effective amounts together with the alpha-olefin while the polymer product is continually removed during the continuous process. Fluidized bed reactors suitable for continuously polymerizing alpha-olefins have been previously described and are well known in the art. Fluidized bed reactors useful for this purpose are described, e.g., in U.S. Pat. Nos. 4,302,565, 4,302,566 and 4,303,771, the disclosures of which are incorporated herein by reference. Those skilled in the art are capable of carrying out a fluidized bed polymerization reaction using the guidelines provided herein.

It is preferred sometimes that such fluidized beds are operated using a recycle stream of unreacted monomer from the fluidized bed reactor. In this context, it is preferred to condense at least a portion of the recycle stream. Alternatively, condensation may be induced with a liquid solvent. This is known in the art as operating in "condensing mode." Operating a fluidized bed reactor in condensing mode generally is known in the art and described in, for example, U.S. Pat. Nos. 4,543,399 and 4,588,790, the disclosures of which are incorporated by reference herein in their entirety.

Advantageously, the use of condensing mode has been found to lower the amount of xylene solubles in isotactic polypropylene and improve catalyst performance when using the preactivated and/or prepolymerized catalyst of the present invention.

This invention also pertains to a novel way of injecting slurried catalyst into a fluidized bed by using a combination of inert liquid solvent and inert gaseous species. Because the catalysts of the present invention are preactivated, some standard types of transportation may not be suitable because polymerization may occur during conveying to the reactor, causing the piping to plug. For example, preactivated and/or prepolymerized catalysts, if fed to the reactor together with monomer feed, can cause premature polymerization in the feed line, which can lead to plugging. Thus, if the preactivated and/or prepolymerized catalyst is conveyed to the primary polymerization reactor together with some or all of the monomer to be polymerized, polymerization in the feed line can be avoided by using high flow rates preferably with Reynolds numbers above about 20,000, to ensure turbulent flow and mixing of the reactants. Optionally, it is known in the art to use stringent temperature control to limit the rate of reaction during prepolymerization although these methods impact significant operational restrictions and costs to the polymerization system. It is preferred, however, to feed the preactivated and/or prepolymerized catalyst to the primary polymerization reactor using a carrier other than the olefin to be polymerized.

The use of an inert gaseous species as the sole carrier can be effective because it does not plug the feed tube. However, large particles and chips may form in the fluidized bed, eventually resulting in discharge system failure due to plugging. In addition, a liquid solvent carrier by itself can cause high levels of hydrocarbon to build in the reactor resulting in high dew points and problems with polymerization reactor operation. The present inventors have surprisingly found, however, that the use of a liquid solvent and an inert gas carrier together as a carrier is a successful way of injecting the preactivated and/or prepolymerized catalysts into the reactor, and it achieves good operability. In addition, conveying the preactivated and/or prepolymerized catalyst to the primary polymerization reactor with a liquid solvent and an inert gas enables the production of polymer having a narrower particle size distribution, greater bulk density and smaller particle size. The mass flow ratio between the inert gas and the liquid solvent should be between 0.01:1.0 and 100:1, and preferably 0.01:1 to 10:1.

Hydrocarbons such as alkanes (e.g., propane, isopentane ($iC_5$), hexane, heptane, and isooctane) and aromatics, substituted and unsubstituted, (e.g., toluene, xylene, naphtha) are preferred as the liquid solvent. The inert gas may be any inert gas compound that does not react with the catalyst. Preferably, the inert gas is selected from nitrogen, ethane, methane, $H_2$, helium, argon, neon, krypton, and xenon.

Generally, catalyst feed lines to polymerization reactors contain from 1 weight percent to 75 weight percent of the catalyst (inclusive of slurry solvents). The amount of total solvent introduced into the reactor should be carefully controlled to avoid the use of excessive quantities of various liquids which could interfere with the operation of the fluidized bed.

The inert gas should be substantially free of catalyst poisons, such as $H_2O$, $O_2$, CO, $CO_2$, $C_2H_2$, and the like. Gas impurity problems may be solved by installing a small purification column in the gas carrier stream. A molecular sieve bed may be installed on the gas carrier line before the junction with the catalyst stream. Gas stream purification methods are well known in the art.

Figure 1:
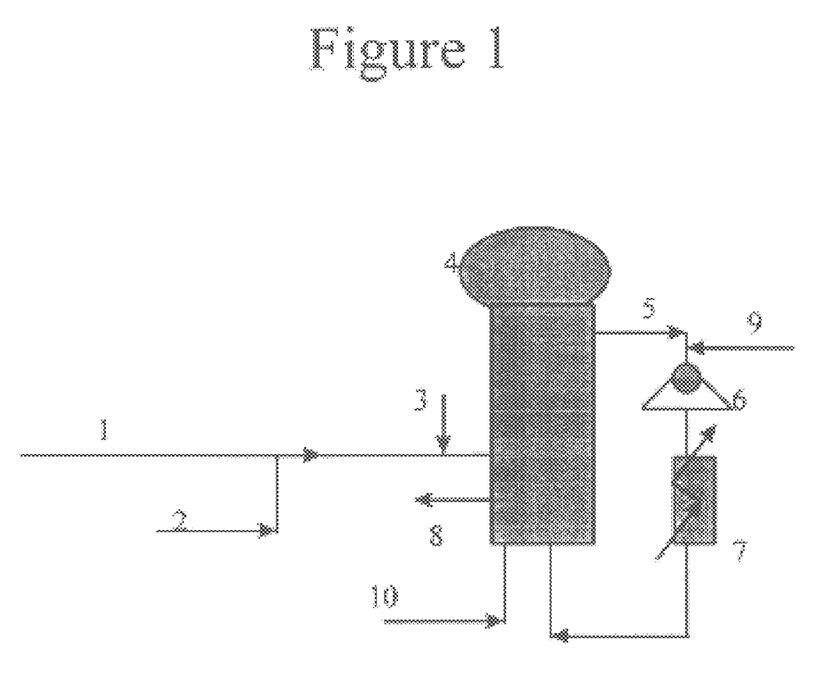
FIG. 1 depicts an exemplary gas phase polymerization reactor system.

An exemplary method for feeding the catalyst to the system is set forth in FIG. 1. FIG. 1 shows a reactor system 4, including an inert gas feed line 1, a catalyst feed line 2, a solvent feed line 3, reactor system 4, recycle line 5 for the reactor, compressor 6, optional heat exchanger or condenser 7, polymer withdrawal stream 8, and olefin feed line 10. An optional solvent feed line for inducing condensing mode is depicted as feed line 9 although solvent line 3 may also be used for this purpose. It is noted that the solvent may be mixed with the gas or catalyst prior to the gas being combined with the catalyst and that FIG. 1 is only a preferred embodiment of such a feed mechanism.

The olefins for use herein include, inter alia, ethylene, propylene, butene-1, pentene-1, hexene-1, 4-methylpentene-1, heptene-1, 1, 4-butadiene, and octene-1 with propylene being preferred. Mixed olefin streams may also be used.

The olefins useful in the process of the present invention may, if desired, also be employed to produce copolymers by copolymerizing them with another olefin in one or more reaction or reactor stages. Such copolymerizations are particularly useful in processes which employ sequential polymerization cycles to produce polymers having improved impact properties, e.g., by homopolymerizing an alpha-olefin in one reactor and subsequently copolymerizing the alpha-olefin with another olefin in a second reactor in the presence of the product of the first reactor. This technique produces polypropylene-polyethylene impact copolymers by a multi-stage process wherein propylene is homopolymerized in one reaction zone and then copolymerized with ethylene in a separate reaction zone, arranged in sequence with the first reaction zone, in the presence of the homopolymer produced in the first reaction zone. When multiple reactors are employed in this manner, it is sometimes necessary to add additional amounts of cocatalyst to the second reactor to maintain an active catalyst although not usually required in the present invention. Additional amounts of the procatalyst and selectivity control agents are generally not required. If desired, most preferably, one SCA is used in the first reactor (e.g., an akyl, cycloalkyl dialkoxysilane or a dicycloalkyl dialkoxysilane) and a second SCA is used in the second reactor (e.g., an alkyl trialkoxysilane).

Hydrogen may also be added to the reaction mixture as a chain transfer agent to regulate molecular weight. Generally, hydrogen is added to the reaction mixture in an amount sufficient to produce a mole ratio of hydrogen to olefin of from about 0.00001:1 to about 0.5:1. In addition to hydrogen, other chain transfer agents may be employed to regulate the molecular weight of the polymers.

To maintain a viable fluidized bed, the superficial gas velocity of the gaseous reactor mixture through the bed must exceed the minimum flow required for fluidization and preferably is at least 0.06 meter per second above minimum flow. Ordinarily, for manufacturing polypropylene the superficial gas velocity does not exceed 0.75 m/s, and most usually no more than 0.4 m/s is sufficient.

Pressures of up to about 7000 kPa can be employed in the process, although pressures of from about 70 kPa to about 3500 kPa are preferred. The partial pressure of the olefin employed is usually maintained between about 56 kPa to about 2800 kPa. To produce polypropylene in a commercially viable manner, it is customary to employ polymerization temperatures of about 50° C., while temperatures of about 65° C. are preferred, as such temperatures result in polymers having desirable polymer properties. However, temperatures in excess of about 120° C. should be avoided to prevent agglomeration of the polymer product. Higher temperatures can be employed depending on the pressure maintained in the reactor.

Polypropylene polymers produced in accordance with the process of the present invention usually have a melt flow rate of from about 0.1 g/10 minutes to about 3000 g/10 minutes, preferably of from about 1 g/10 minutes to about 1000 g/10 minutes. The melt flow of a polymer varies inversely with its molecular weight and is defined by the desired polymer product properties.

Polypropylene-containing polymers produced in accordance with the process of the present invention typically are granular materials having an average particle size of from about 0.01 to about 0.20 centimeters, usually of from about 0.02 to about 0.13 centimeters, in diameter. The particle size is important for the purpose of readily fluidizing the polymer particles in the fluidized bed reactor and may be different for different reactor operations.

Polypropylene-containing polymers produced in accordance with the process of the present invention usually have a bulk density of from about 200 kilograms per cubic meter to about 500 kilograms per cubic meter.

The molecular weight distribution of polymers produced with the present preactivated and/or prepolymerized catalysts can be broadened or narrowed while not adversely affecting the other properties of the polymer, including xylene solubles, productivity, hydrogen response and modulus.

The invention now will be described in more detail with reference to the following non-limiting examples.

EXAMPLES

The following Examples are designed to illustrate the process of the present invention and are not intended as a limitation upon the scope thereof.

Examples 1–11

Procatalyst Preparation

The following catalysts were made with a precursor of carbonated magnesium ethoxide (CMEO), of approximately 15 μm in diameter, $TiCl_4$ and di-isobutyl phthalate which were dissolved in monochlorobenzene (MCB) and heated at 90–115° C. for one to two hours and filtered. The procatalyst was contacted twice more with $TiCl_4$ and MCB and heated and filtered. The procatalysts had Ti weight percents of 1.5–3.5, ethoxide weight percents of 0.05 to 0.6, and di-isobutyl phthalate weight percents of 4.0 to 15.0. This procatalyst is denoted simply by the letter "C".

In the preparation of an additional procatalyst material, a magnesium and titanium-containing precursor of approximately 25 μm in diameter first was prepared and then this precursor was reacted with $TiCl_4$ and di-isobutyl phthalate as described above. The precursor was prepared by reacting magnesium ethoxide (Mg(OEt)2) with titanium tetraethoxide ($Ti(OEt)_4$), $TiCl_4$, o-cresol, and ethyl alcohol in the presence of monochlorobenzene (MCB). The solid product was crystallized, filtered, washed and subsequently washed twice more. The filter cake then was de-watered and dried with circulating heated nitrogen to produce a solid precursor component. This solid precursor component then was reacted with $TiCl_4$ and di-isobutyl phthalate as described above to generate a procatalyst component designated as "M."

Preactivated Catalyst Preparation

The procatalysts C and M were preactivated by contacting the procatalyst according to Table 1 in an inert hydrocarbon first with triethyl aluminum (TEAL) and then the SCAs. The amount and type of inert hydrocarbon was sufficient to maintain good mixing in the desired manufacturing equipment The reaction mixture was optionally temperature regulated at or slightly below ambient temperature depending upon the heat transfer characteristics of the manufacturing system but critically maintained below 40 degrees Celsius. The mixture then was mildly agitated for between 15 and 60 minutes. The solid component was then separated from the reaction mixture by filtration and re-suspended in fresh inert hydrocarbon of appropriate volume followed by mild agitation. The solid was again separated from the hydrocarbon with optional repetitions depending upon the manufacturing efficiency. The remaining hydrocarbon was then extracted from the solid by an efficient manipulation of temperature, pressure, and flow with an inert gas but maintained below about 150 degrees Fahrenheit. The final solid was then slurried in a common mineral oil of appropriate viscosity to protect the active catalyst from exposure to air and water and also to provide an efficient means of handling the preactivated catalyst material. The resulting material is stable to auto-decomposition for a period of more than one year. These preactivated catalysts were denoted R1, R2, R55, R82, and S.

Prepolymerized Catalyst Preparation

The procatalysts C and M were prepolymerized by contacting according to Table 1 in an inert hydrocarbon first with triethyl aluminum (TEAL) and then the SCAs. The amount and type of inert hydrocarbon was sufficient to maintain good mixing in the desired manufacturing equipment The reaction mixture was optionally temperature regulated at or slightly below ambient temperature depending upon the heat transfer characteristics of the manufacturing system but critically maintained below 40 degrees Celsius. The mixture then was mildly agitated for between 15 and 60 minutes. Optionally at this point, the mixture was exposed to propylene at a rate and pressure adequate to maintain the temperature limitations set forth above. The amount of propylene was varied for different preparations between about 1 gram propylene per gram procatalyst to about 10 gram per gram. After consumption of the propylene, the solid component was separated from the reaction mixture by filtration and re-suspended in fresh inert hydrocarbon of appropriate volume followed by mild agitation. If propylene had not been added during the initial reaction as stated above, the propylene could now be added to the mixture of prepared preactivated catalyst in inert hydrocarbon. Optionally at this point additional TEAL was added if the manufacturing capability was sufficient to meet the temperature requirements stated above. Finally, the solid was again separated from the hydrocarbon with optional repetitions depending upon the manufacturing efficiency. The remaining inert hydrocarbon was then extracted from the solid by an efficient manipulation of temperature, pressure, and flow with an inert gas but maintained below about 150 degrees Fahrenheit. The final solid was then slurried in a common mineral oil of appropriate viscosity to protect the active catalyst from exposure to air and water and also to provide an efficient means of handling the preactivated catalyst material. The resulting material is stable to auto-decomposition for a period of more than one year. These prepolymerized catalysts were denoted as N1, N2, N3, and M.

TABLE 1

DESCRIPTION OF PREACTIVATED AND PREPOLYMERIZED CATALYSTS

| Catalyst | SCA/Ti (mole) | Al/Ti (mole) | Description |
|---|---|---|---|
| R1 | 7.0 | 25.0 | DCPDMS/TEAL preactivated C |
| R2 | 10.0 | 20.0 | ETES/TEAL preactivated C |
| R55 | — | — | 50% R1/50% R2 physical mixture |
| R82 | — | — | 80% R1/20% R2 physical mixture |
| S | 10 and 5 | 40.1 | ETES and DCPDMS/TEAL preactivated C |
| N1 | 7.0 | 25.0 | DCPDMS/TEAL and C prepolymerized with 1 gm propylene/gm catalyst |
| N2 | 7.0 | 25.0 | DCPDMS/TEAL and C prepolymerized with 10 gm propylene/gm catalyst |
| N3 | 7.0 | 25.0 | DCPDMS/TEAL and C prepolymerized with 3 gm propylene/gm catalyst |
| T | 5 | 15.0 | NPTMS/TEAL preactivated C |
| T-C | 11 | 25 | NPTMS/TEAL preactivated C |
| M | 7 | 25 | DCPDMS/TEAL and M prepolymerized with 1 gm propylene/gm catalyst |

DCPDMS = dicyclopentyl dimethoxy silane
ETES = ethyl triethoxysilane
NPTMS = n-propyl trimethoxysilane

Polymerizations

The aforementioned catalysts (including preactivated and prepolymerized catalysts) were utilized in various polymerization reactions with propylene. Examples 1–7 were liquid phase polypropylene polymerizations (LIPP) in a 1 gallon autoclave, using a ratio of titanium to TEAL of 1:60, and a hydrogen content to maintain a vapor pressure of about 400 psig. Examples 8–11 also were standard LIPP reactions using a Ti:Al ratio of 1:60, and a hydrogen equivalent to maintain a melt flow (MF) of about 2–5. In examples 9 and 11, the hydrogen partial pressure was increased to 600 psig to measure the effect on MF. The results of the LIPP reactions are shown in Tables 2 and 3 below.

TABLE 2

POLYMERIZATION REACTIONS

| Ex. | Catalyst | % Ti | YD (Kg pp/gm catalyst) | YD (g polymer × $10^6$/gmTi) | BD (bulk density) (g/cc) | XS (% w) | MF (dg/min) |
|---|---|---|---|---|---|---|---|
| 1 | R1 | 1.5 | 21.6 | 1.5 | 0.41 | 3.0 | 3.3 |
| 2 | R1 | 1.5 | 18.3 | 1.2 | 0.41 | 3.3 | 0.8 |
| 3 | R1 | 1.3 | 23.5 | 1.8 | 0.40 | 2.9 | 3.3 |
| 4 | R2 | 1.5 | 21.2 | 1.4 | 0.35 | 6.0 | 41 |
| 5 | R2 | 1.2 | 19.5 | 1.7 | 0.33 | 6.6 | 26 |
| 6 | M | 0.9 | 10.8 | 1.2 | 0.44 | 2.6 | 3.3 |
| 7 | S | 1.4 | 21.5 | 1.5 | 0.40 | 4.2 | 11 |

TABLE 3

POLYMER PREPARATIONS

| Ex. | Catalyst | H2 (psig) | BD (g/cc) | XS (% w) | MF (dg/min) |
|---|---|---|---|---|---|
| 8 | R-55 | 200 | 0.32 | 3.4 | 2.3 |
| 9 |  | 600 | 0.39 | 4.2 | 18 |
| 10 | R-82 | 200 | 0.38 | 3.6 | 2.2 |
| 11 |  | 600 | 0.40 | 4.0 | 6.2 |

As shown in Table 2, preactivated catalysts can be used in liquid phase polymerization to produce polypropylene in high yield, without adversely affecting the selectivity, bulk density and melt flow. It was generally thought, however, that if these preactivated catalysts were fed to a gas phase reactor, rapid polymerization would occur causing undesirable generation of heat, increase of agglomeration, tube plugging, reactor sheeting and ultimately reactor shut down.

Table 3 shows that the physically-mixed catalysts R-55 & R-82 demonstrated a surprisingly strong melt flow response (i.e., non-linear) and decidedly better high melt flow performance than expected. These particular catalysts are suited for higher melt flow products, a regime where both the melt flow difference between the constituent catalysts is the highest and where hydrogen-efficient silanes such as ETES exhibit the best performance.

Examples 12–17

Some of the catalysts listed in Table 1 above were subjected to a high TEAL LIPP polymerization and/or a high temperature polymerization. The high TEAL polymerizations shown in Table 4 below were conducted in the same manner as the liquid phase polymerizations of Examples 1–11, but with a TEAL:Ti molar ratio of 250:1. The high temperature polymerizations were conducted in the same manner as the liquid phase polymerizations of Examples 1–11, but at a temperature of 80° C. The high temperature and high TEAL polymerizations ran at both the elevated TEAL and temperature, but otherwise conditions were the same as the standard liquid phase polymerizations of examples 1–11.

The high TEAL and high temperature polymerizations were conducted in an attempt to investigate extreme reaction conditions such as may be present in a poorly mixed polymerization reactor. The data for laboratory gas phase polymerization shown in Table 4 was gathered by carrying out polymerization using the indicated catalyst in a specialized small scale reactor at a temperature of 67° C., a TEAL:Ti ratio of 60:1 and hydrogen in an amount used to generate a 2–5 MF polymer using a conventional catalyst. The results shown in Table 4 below are all in terms of xylene solubles (XS) expressed as percentages of the weight of polymer produced, which is an indicator of selectivity of the catalyst and critical catalyst performance.

TABLE 4

POLYMERIZATION REACTIONS

| | | | Xs (%) | | | |
|---|---|---|---|---|---|---|
| Ex. | catalyst system | gas phase | std LIPP | high TEAL | high temp | high TEAL & high temp |
| 12 | T-C | | 2.2 | 2.0 | | 5.0 |
| 13 | T | 3.9 | 2.2 | | | |
| 14 | R1 | 3.7 | 3.1 | 2.9 | | 4.0 |
| 15 | N1 | 2.6 | 3.2 | | 3.1 | 3.0 |
| 16 | R2 | | 6.6 | 6.5 | | 11.8 |
| 17 | S | 4.6 | 4.2 | | 5.4 | 4.8 |

The data in Table 4 shows a relatively good correlation between high TEAL and high temperature LIPP polymerizations and gas phase polymerizations. Table 4 also reveals that while operating a higher TEAL did not significantly affect selectivity, extended LIPP with higher TEAL and high temperature did decrease selectivity. As indicated, reaction conditions might still exist in a gas phase or poorly mixed other polymerization reactor which would result in undesirable catalyst and reactor performance. Importantly, the polymerization performance is a function of the desired polymer product and hence, particular catalyst used. There is a need for polymerization control when using preactivated and/or prepolymerized catalysts.

Examples 18–21

Examples 18–21 were carried out in the same manner as examples 1–11, except the LIPP polymerizations were conducted using prepolymerized procatalysts N1, N2 and N3. The amount of hydrogen used in these examples was that required to yield a MF within the range of 2 to 5. The data are tabulated in Table 5 below.

TABLE 5

POLYPROPYLENE PREPARATIONS

| Example | Catalyst | % Ti | YD (g polymer × $10^6$/gmTi) | BD (g/cc) | XS (%) | $H_2$ (psig) |
|---|---|---|---|---|---|---|
| 18 | N1 | 0.8 | 1.4 | 0.39 | 3.3 | 500 |
| 19 | N1 | 0.8 | 1.2 | 0.39 | 2.9 | (frac. MF) |
| 20 | N3 | | | 0.38 | | |
| 21 | N2 | 0.2 | 0.8 | 0.36 | 2.9 | 600 |

The results of LIPP polymerization using prepolymerized procatalysts are similar to the results shown in Table 2 using preactivated procatalysts. For example, these data reveal that prepolymerized procatalysts can be used in liquid phase polymerizations to produce polypropylene in high yield, without significantly adversely affecting the selectivity, bulk density and melt flow. It was generally thought, however, that if these prepolymerized catalysts were fed to a gas phase reactor, rapid polymerization would occur causing undesirable generation of heat, increase of agglomeration, tube plugging, reactor sheeting and ultimately reactor shut down.

Examples 22–40

Gas Phase Experiments

Preactivated and prepolymerized catalysts were used to produce polypropylene homopolymer in a fluid bed gas phase reactor. The reaction conditions were $P \approx 3 \times 10^6$ Pa, $P_{PP} \approx 2.3 \times 10^6$ Pa, T=65° C. in a gas phase reactor with a reactor superficial gas velocity of about 0.3 m/sec. A recycle stream, at about 15 m/s was used as well. The reactor system was set up essentially as shown in FIG. 1. TEAL was used as the cocatalyst. A small sieve bed was installed near the reactor to remove contaminants in the nitrogen feed. The mass flow ratio for mixed isopentane/nitrogen carriers ($N_2$/$iC_5$) was about 1.35. The results of the gas phase polymerizations are set forth in Table 6 below.

TABLE 6

| Example | 22 | 23 | 24 | 25 |
|---|---|---|---|---|
| Catalyst: | R | R1 | N1 | N2 |
| Carrier | N2 | N2 | N2 | N2 |
| Carrier Flow Rate | | | | |
| Reaction Conditions: | | | | |
| H2/C3 Molar Ratio | 0.02956 | 0.02378 | 0.02193 | 0.01787 |
| Average Residence Time (hr.) | 1.46666 | 1.95620 | 2.77471 | 6.90204 |
| Bed Weight (kg) | 25.5 | 26.6 | 26.4 | 26.1 |
| Fluidized Bulk Density | 190.3 | 190.2 | 131.6 | 132.2 |

TABLE 6-continued

| | | | | |
|---|---|---|---|---|
| (kg/m^3) | | | | |
| TEAL Concentration (wgt. %) | 5.00 | 5.00 | 5.00 | 5.00 |
| TEAL Flow Rate (cc/hr.) | 188.92 | 247.6 | 301.19 | 298.8 |
| SCA | DCPDMS | | | |
| SCA Concentration (wgt. %) | 5.00 | | | |
| SCA Flow Rate (cc/hr.) | 251.9 | | | |
| TEAL/SCA Molar Ratio | 1.5 | | | |
| Al/Ti Molar Ratio | 213 | 58 | 54 | 114 |
| SCA/Ti Molar Ratio | 131.0 | | | |
| Resin Properties: | | | | |
| Melt Flow (dg/min.) | 5.93 | 4.324 | 4.19 | 7.192 |
| Xylene Solubles (%) | 1.13 | 1.38 | 1.76 | 3.22 |
| Productivity (kg/g-Ti) | 1369.9 | 1111.1 | 735.3 | 980.4 |
| Settled Bulk Density (kg/m^3) | 367.8 | 372.6 | 424.0 | 438.1 |
| Average Particle Size (cm) | 0.0620 | 0.0719 | 0.0310 | |
| % on #10 Mesh Screen | 0 | 0 | 0 | 0 |
| % Fines (<120 Mesh) | 1.5 | 3.52 | 11.56 | 9.6899 |

| Example | 26 | 27 | 28 | 29 | 30 |
|---|---|---|---|---|---|
| Catalyst: | 205 | 205 | R1 | R1 | R1 |
| Carrier | nitrogen | nitrogen | nitrogen | nitrogen | Nr/iC |
| Carrier Flow kg/hr) | 2.27 | 1.91 | 2.27 | 2.27 | 2.27 |
| Reaction Conditions: | | | | | |
| H2/C3 Molar Ratio | 0.0318 | 0.1027 | 0.0170 | 0.0220 | 0.0220 |
| Average Residence Time (hr.) | 2.3 | 3.8 | 3.3 | 3.3 | 2.7 |
| Bed Weight (kg) | 25.71 | 37.51 | 25.26 | 29.29 | 26.89 |
| Fluid Bulk Density (kg/m^3) | 170.10 | 238.30 | 145.88 | 163.65 | 136.51 |
| TEAL Concentration (wgt. %) | 5 | 5 | 5 | 5 | 5 |
| TEAL Flow Rate (cc/hr.) | 59.88 | 90.717 | 100.9 | 122.15 | 135.03 |
| SCA | DCPDMS | DCPDMS | | DCPDMS | DCPDMS |
| SCA Concentration (wt. %) | 5 | 5 | | 0.5 | 2 |
| SCA Flow Rate (cc/hr.) | 108.1 | 159.49 | | 101.69 | 49.238 |
| TEAL/SCA Molar Ratio | 1.11 | 1.14 | | 24.03 | 13.72 |
| Al/Ti Molar Ratio | 106 | 107 | 84 | 122 | 167 |
| SCA/Ti Molar Ratio | 67.13 | 112.74 | | 5.57 | 13.92 |
| Resin Properties: | | | | | |
| Melt Flow (dg/min.) | 5.48 | 31.9 | 4.52 | 4.35 | 4.8 |
| Xylene Solubles (%) | 1.27 | 1.56 | 1.99 | 2.3 | 1.3 |
| Productivity (kg/g-Ti) | 1053 | 1053 | 654 | 741 | 1053 |
| Settled Bulk density (kg/m^3) | 318.59 | 306.09 | 424.04 | 447.60 | 459.29 |
| Average Particle Size (cm) | 0.06 | 0.07 | 0.10 | 0.12 | 0.00 |
| % Fines (<120 Mesh) | 1.31 | 1.80 | 3.31 | 3.37 | 10.33 |

| Example | 31 | 32 | 33 | 34 | 35 |
|---|---|---|---|---|---|
| Catalyst: | R1 | R1 | R82 | R82 | R55 |
| Carrier | nitrogen/iC5 | nitrogen/iC5 | nitrogen/iC5 | nitrogen/iC5 | nitrogen/iC5 |
| Carrier Flow kg/hr) | 2.27 | 2.27 | 2.27 | 2.27 | 2.27 |
| Reaction Conditions: | | | | | |
| H2/C3 Molar Ratio | 0.0219 | 0.1701 | 0.0175 | 0.0236 | 0.0117 |
| Average Residence Time (hr.) | 2.1 | 2.4 | 2.6 | 2.6 | 2.3 |
| Bed Weight (kg) | 26.04 | 30.72 | 27.14 | 27.56 | 26.22 |
| Fluid Bulk Density (kg/m^3) | 139.21 | 164.55 | 137.54 | 134.33 | 142.28 |
| | 35.80 | | | | |
| TEAL Concentration (wgt. %) | 5 | 5 | 5 | 5 | 5 |
| TEAL Flow Rate (cc/hr.) | 80.837 | 79.041 | 80.538 | 79.939 | 78.741 |
| SCA | NPTMS | | | DCPDMS | |
| SCA Conc. (wt. %) | 0.15 | | | 2 | |
| SCA Flow Rate (cc/hr.) | 148.78 | | | 200.88 | |
| TEAL/SCA Molar Ratio | 26.06 | | | 1.99 | |
| Al/Ti Molar Ratio | 103 | 83 | 87 | 73 | 53 |
| SCA/Ti Molar Ratio | 3.33 | | | 35.80 | |
| Resin Properties: | | | | | |
| Melt Flow (dg/min.) | 4.25 | 121.06 | 5.36 | 3.67 | 4.95 |
| Xylene Solubles (%) | 1.56 | 2.76 | 2.62 | 1.17 | 3.7 |
| Productivity (kg/g-Ti) | 1020 | 1111 | 885 | 725 | 621 |
| Settled Bulk density (kg/m^3) | 468.59 | 478.04 | 459.29 | 456.89 | 452.24 |
| Average Particle Size (cm) | 0.03 | 0.03 | 0.03 | 0.03 | 0.03 |
| % Fines (<120 Mesh) | 10.92 | 9.84 | 12 | 16.33 | 11.9 |

| Example | 36 | 37 | 38 | 39 | 40 |
|---|---|---|---|---|---|
| Catalyst: | R55 | S | S | M | M |
| Carrier | nitrogen/iC5 | nitrogen/iC5 | nitrogen/iC5 | nitrogen/iC5 | nitrogen/iC5 |
| Carrier Flow kg/hr) | 2.27 | 2.27 | 1.91 | 2.27 | 1.68 |
| Reaction Conditions: | | | | | |
| H2/C3 Molar Ratio | 0.0219 | 0.0130 | 0.0381 | 0.0190 | 0.0225 |
| Avg Residence Time (hr.) | 2.2 | 2.2 | 3.0 | 2.2 | 3.5 |
| Bed Weight (kg) | 27.04 | 27.01 | 33.10 | 27.84 | 26.67 |
| Fluid Bulk Density (kg/m^3) | 133.44 | 136.98 | 234.44 | 133.83 | 98.00 |
| TEAL Concentration (wgt. %) | 5 | 5 | 5 | 5 | 5 |
| TEAL Flow Rate (cc/hr.) | 86.226 | 107.78 | 56.588 | 109.28 | 109.88 |

TABLE 6-continued

| SCA | DCPDMS | | | | DCPDMS |
|---|---|---|---|---|---|
| SCA Concentration (wt. %) | 2 | | | | 2 |
| SCA Flow Rate (cc/hr.) | 207.3 | | | | 198.74 |
| TEAL/SCA Molar Ratio | 2.08 | | | | 2.77 |
| Al/Ti Molar Ratio | 48 | 136 | 77 | 46 | 65 |
| SCA/Ti Molar Ratio | 23.99 | | | | 32.28 |
| Resin Properties: | | | | | |
| Melt Flow (dg/min.) | 3.79 | 6.49 | 33.43 | 3.75 | 3.58 |
| Xylene Solubles (%) | 1.19 | 2.95 | 4.17 | 3.37 | 0.94 |
| Productivity (kg/g-Ti) | 543 | 592 | 1000 | 403 | 465 |
| Settled Bulk density (kg/m^3) | 459.29 | 449.84 | 421.47 | 461.54 | 475.64 |
| Average Particle Size (cm) | 0.03 | 0.03 | 0.05 | 0.05 | 0.04 |
| % Fines (<120 Mesh) | 14.71 | 13.2 | 6.90 | 8.0999 | 8.71 |

205 denotes SHAC ® 205 catalyst, which is commercially available from Union Carbide corporation, Danbury, Ct.

The comparative examples are the gas phase polymerization experiments carried out using conventional catalysts that were not preactivated or prepolymerized (examples 22, 26 and 27). As can be seen from the examples above, a catalyst that has been preactivated or prepolymerized off-line can be used in gas phase polymerization to produce polypropylene in high yield, without significantly adversely affecting the selectivity, bulk density and melt flow. In addition, despite what was generally thought in the art, preactivated and prepolymerized catalysts can be used in a gas phase polymerization reactor without causing undesirable generation of heat, increase of agglomeration, tube plugging, reactor sheeting and ultimately reactor shut down Based on examples 23–25, 28, 29 and 38, when the preactivated and/or prepolymerized catalysts were fed to the gas phase reactor using nitrogen only as the carrier, there were some minor problems controlling the particle size, and some agglomerates (about 0.5 cm–1.25 cm) formed. The number of large particles was reduced by raising the reactor temperature, but they were not completely eliminated. However, the addition of about 1.0 to 0.6 kg/hr of iC5 to the $N_2$ carrier flow in examples 30–37, 39 and 40 completely eliminated the agglomerates or chunks.

Figure 2:
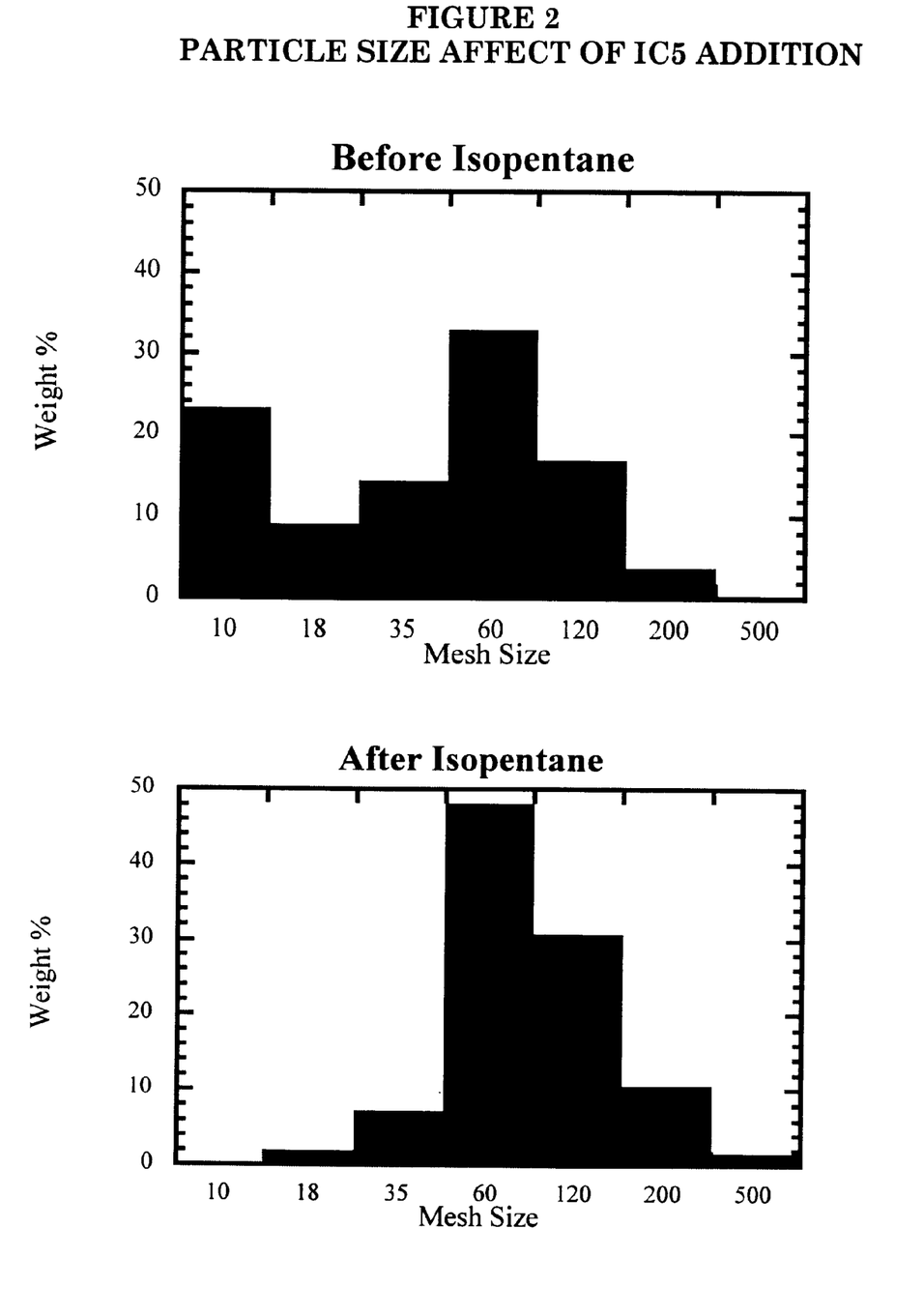
FIG. 2 depicts two bar graphs illustrating how the addition of isopentane to a nitrogen catalyst carrier stream can reduce the particle size distribution of the resulting polymer particles.

FIG. 2 shows the average particle size distribution for the 36 hours before and after adding iC5 to the catalyst carrier for R1. Before iC5 was added, over 20% of the polymer had a particle size so high it would not go through the largest screen. Within 12 hours, these polymer particles had disappeared. The number of particles on the 18 mesh screen also substantially decreased to about 20% of what it was without iC5 and the number of particles passing through the 120 mesh screen more than doubled. In addition, it is clear to see that the molecular weight distribution narrowed upon addition of isopentane.

Figure 3:
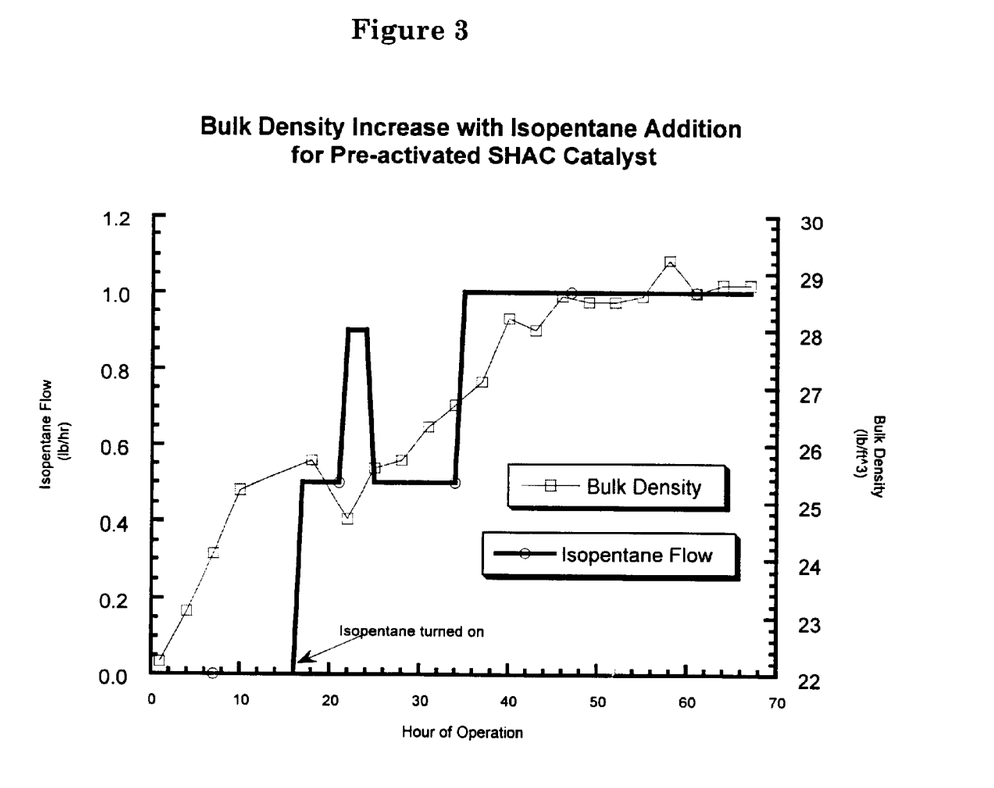
FIG. 3 is a graph illustrating an increase in bulk density with the addition of isopentane to a nitrogen catalyst carrier stream.
Figure 4:
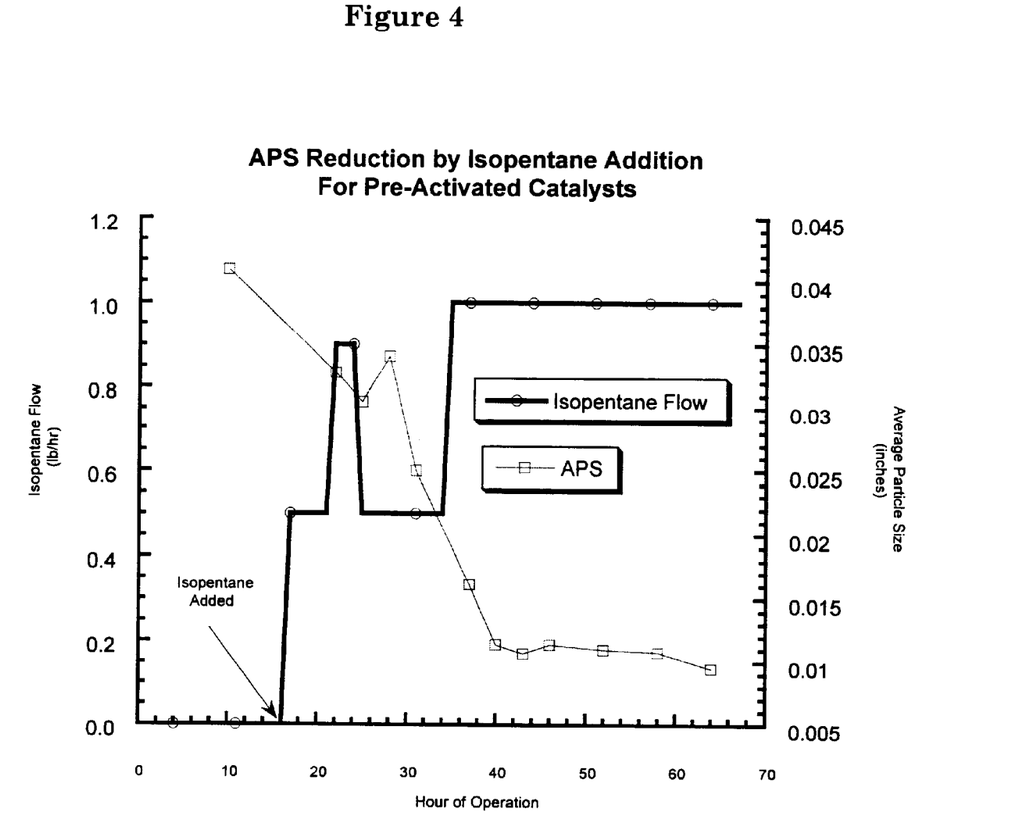
FIG. 4 is a graph illustrating a decrease in average particle size with the addition of isopentane to a nitrogen catalyst carrier stream.

Indeed, this decrease in average particle size, and hence, increase in bulk density, was further demonstrated in examples 33 and 34 when homopolymer polypropylene was made using R-82 catalyst. The $N_2$ carried the catalyst for approximately 4.6 meters and iC5 (0.2–0.4 kg/hr) was injected 2–5 cm prior to the reactor. FIG. 4 clearly shows a significant decrease in average particle size, starting at about 0.08 cm and reducing it to 0.025 cm. FIG. 3 shows that the bulk density increased from 0.396 g/cc to 0.465 g/cc with the use of isopentane in accordance with a preferred embodiment of the present invention.

Comparing the comparative examples (22, 26 and 27), with the inventive samples, it is clear to see that the use of preactivated and prepolymerized can significantly reduce the amount of SCA added to the reactor, without adversely affecting the productivity, selectivity or melt flow. Given the knowledge in the art extant at the time of this invention, it is unexpected that off-line preactivated and/or prepolymerized catalysts could be used at all in gas phase polymerization, much less used advantageously to reduce the amount of SCA, increase the bulk density and reduce the particle size.

Product Properties

Molecular Weight Distribution (MWD)

Table 7 below shows the molecular weight distribution results for polypropylene homopolymers by gel permeation chromatography (GPC). R82 produced the broadest molecular weight distribution (MWD). The narrowest MWD's were made with R1. The addition of NPTMS did broaden the MWD of polypropylene made with R1, but did not make the MWD as broad as the catalysts that used ETES. Adding DCPDMS to R55 reduced the xylene solubles and narrowed the MWD.

TABLE 7

MWD FOR EACH CATALYST

| Catalyst | Melt Flow (dg/min) | Mn (g/mol) | Mw/Mn | Mz/Mn |
|---|---|---|---|---|
| R | 5.48 | 48,000 | 5.58 | 18.9 |
| R1 | 4.52 | 59,800 | 4.52 | 15.2 |
| R1 | 4.80 | 58,100 | 4.53 | 13.2 |
| R1 | 4.25 | 55,700 | 4.99 | 16.0 |
| R82 | 5.36 | 45,600 | 6.00 | 20.9 |
| R55 | 4.95 | 52,700 | 5.20 | 17.5 |
| R55 | 3.79 | 58,400 | 4.89 | 15.5 |
| S | 6.49 | 49,300 | 5.14 | 17.6 |
| M | 3.75 | 64,000 | 4.32 | 12.5 |

While the invention has been described in detail with reference to particularly preferred embodiments and examples, those skilled in the art recognize that various modifications may be made to the invention without significantly departing from the spirit and scope thereof. All documents mentioned above are incorporated by reference herein in their entirety.

What is claimed is:

1. A process for preparing a mixture of two or more solid olefin polymerization catalyst compositions comprising:
  preparing a first solid, olefin polymerization catalyst composition according to the process steps comprising:
   a) contacting a magnesium compound selected from the group consisting of magnesium dialkoxides, magnesium-titanium alkoxides and carbonated magnesium alkoxides with a tetravalent titanium halide, a polycarboxylic acid ester, optionally an alcohol and further optionally, a phenol or substituted phenol compound, in a halohydrocarbon liquid, and recovering the resulting solid reaction product;
   b) recontacting the solid reaction product one or more times with the tetravalent titanium halide and optionally the polycarboxylic acid ester, in a halohydrocarbon liquid, and further optionally, at the same time or separately, contacting the solid reaction product with an acid halide compound corresponding to the acid -moiety of the polycarboxylic acid ester, to form a second solid reaction product, and recovering the resulting second solid reaction product;

c) contacting the second solid reaction product with an organoaluminum co-catalyst compound and at least one silicon-containing external electron donor compound containing at least one silicon-oxygen-carbon bridge in an inert diluent in the substantial absence of an olefin to form a solid, olefin polymerization catalyst composition; and d) recovering the resulting solid, olefin polymerization catalyst composition;

preparing a second solid, olefin polymerization catalyst composition according to the process comprising steps a), b), c) and d), said second solid, olefin polymerization catalyst composition differing from said first solid, olefin polymerization catalyst composition; and combining the first and second solid, olefin polymerization catalyst compositions, and recovering the resulting product.

2. The process of claim 1 wherein in each step c) the silicon-containing external electron donor compound is of a formula $R^1_m SiY_n X_p$ wherein, $R^1$ is a hydrocarbyl group having from 4 to 20 carbon atoms, and having a non-primary carbon atom attached directly to the silicon atom, Y is —$OR^2$ or —$OCOR^2$ wherein $R^2$ is a hydrocarbyl group containing 1 to 20 carbon atoms, X is hydrogen or halogen, m is a number from 0 to 3, n is a number from 1 to 4, p is a number from 0 to 1, and m+m+p=4.

3. The process of claim 1 wherein two silicon-containing external electron donor compounds are used in each step c).

4. The process of claim 3 wherein the two silicon-containing external electron donor compounds are dicyclopentyldimethoxysilane and either n-propyltrimethoxysilane or tetraethoxysilane.

5. The process of claim 1 additionally comprising the step of e) drying the resulting solid, olefin polymerization catalyst composition after each step d).

6. The process of claim 1 wherein in each step b) the solid reaction product is contacted with an acid halide compound corresponding to the acid moiety of the polycarboxylic acid ester.

7. The process of claim 6 wherein the tetravalent titanium halide is titanium tetrachloride, the polycarboxylic acid ester is diisobutylphthalate, and the acid halide is phthaloyl dichloride.

8. The process of claim 1 wherein each step c) is conducted at a temperature less than 40° C.

9. The process of any one of claims 1–8 additionally comprising the step of contacting from 1 to 10 grams of propylene per gram of solid, olefin polymerization catalyst composition mixture under prepolymerization conditions and recovering the resulting product.

10. The process of claim 9 wherein the prepolymerization is conducted at a temperature less than 40° C.

11. A solid olefin polymerization catalyst composition mixture prepared according to the process of any one of claims 1–8.

12. A solid olefin polymerization catalyst composition prepared according to the process of claim 9.

13. A solid olefin polymerization catalyst composition prepared according to the process of claim 10.

* * * * *